Patented June 27, 1950

2,512,807

UNITED STATES PATENT OFFICE 2,512,807

PURIFICATION OF TITANIUM HALIDES

Douglas Gillison Nicholson, Pittsburgh, Pa.

No Drawing. Application September 23, 1947,
Serial No. 775,744

8 Claims. (Cl. 202—57)

This invention relates to the purification of titanium tetrahalides and more particularly to the decolorization of titanium tetrachloride and the removal therefrom of the undesirable color-imparting impurities.

Titanium tetrahalides have become increasingly in demand as industrial raw materials, especially for use in the titanium dioxide pigment industry and for the production of pure ductile titanium. The pigment industry demands a highly pure raw material, either for the preparation of "seed" utilized in the more common solution hydrolysis method of manufacture or for the newer so-called "vapor-phase process" wherein the titanium tetrahalide is oxidized in the vapor phase directly to $TiO_2$. The "seed" preparation is an important step in the solution hydrolysis method because of the controlling effect of this "seed" upon the pigment crystal form, size and quality. The relatively new vapor phase process for making the pigment involves oxidation of titanium tetrahalide vapor, particularly titanium tetrachloride, by means of an oxygen-containing gas. This reaction results in solid $TiO_2$ particles suspended in the halogen-containing product gases, from which the $TiO_2$ is then separated and treated for various pigment uses. Promising results have also been obtained in producing pure ductile metallic titanium by reduction of titanium tetrachloride by magnesium. The product has numerous excellent physical and chemical properties and has many potential uses. In all of the above processes, it is especially important to the quality of the final product that the titanium halide employed be highly pure. Particularly essential is that metallic and other impurities such as halogen-containing compounds of iron, zirconium, silicon, vanadium, carbon, and the like be removed. For instance, if titanium tetrachloride containing these impurities is vaporized and oxidized, a brown, discolored $TiO_2$ results which is practically useless as a pigment. Similarly, it has been shown that small amounts of impurities in the titanium halide will cause the product titanium metal to lose ductility and workability and become brittle.

The titanium tetrahalides used for the preparation of titanium oxide pigments and for other purposes are generally prepared by reacting a titaniferous ore with a halogen gas in the presence of a reducing agent at an elevated temperature. The desired titanium halide is thus formed; but in addition, certain impurities such as those mentioned above, which are present in such ores, are similarly transformed to volatile compounds. A large amount of the iron and other halides which are present in amounts greater than their solubility in the liquid titanium tetrahalide may be removed by settling and decantation or filtration. The crude product then is a mixture of the titanium halide with a minor but disadvantageous quantity of contaminating halides and oxyhalides. The removal of these contaminants and decolorization of the titanium tetrahalide presents a difficult problem in industrial research.

Decolorization of such "crude" titanium halides has been effected by various methods. Processes involving the tetrachloride have been most intensively studied. The majority of these decolorization processes entail refluxing and subsequent distillation of the "crude" material using a wide variety of treating agents, such as lower valent titanium compounds, activated adsorbents, active sulfides, or hydrated ferrous sulfate. Closely controlled fractionation is also possible, but the difference in boiling point and volatility between $TiCl_4$ (B. P. 136.5° C.) and some of the impurities, for instance $VOCl_3$ (B. P. 127.2° C.) is slight and the strict requirements of the operation, i. e., reduction of impurity contents to a few parts per million, render such fractionation operations commercially impractical.

It is accordingly among the objects of this invention to overcome the difficulties heretofore found in attempting to purify titanium tetrahalides. A further object is to decolorize the said tetrahalides and remove impurities therefrom by a relatively more simple and inexpensive process than has heretofore been possible. A particular object is to purify titanium tetrachloride and to obtain it as a clear, substantially colorless material. Another object is to prepare titanium tetrahalides, especially the chloride, of such purity that they may subsequently be oxidized to produce high grade titanium oxide pigments, as well as reduced to titanium metal of high ductility.

The above and other objects have now been realized by my invention, which broadly comprises effecting the purification and decolorization of a titanium tetrahalide by contacting the same with a titanyl halide, namely the partial hydrolysis product formed when a titanium tetrahalide is itself reacted with a limited amount of water.

In a preferred embodiment, my invention comprises subjecting impure anhydrous $TiCl_4$, containing difficultly separable materials, to contact with titanyl chloride, heating the mixture, and subsequently distilling off and collecting the decolorized, purified $TiCl_4$. The titanyl chloride may be prepared "in situ" by adding the $TiCl_4$ to a limited amount of water, or it may be first separately prepared. In either case, the water effecting hydrolysis may be free water or it may be the water of hydration found in so-called "hydrous titania." The titanium tetrahalide, as well as the objectionable color-imparting halides, are all readily hydrolyzed, forming products which are either non-volatile, or less volatile than the corresponding halides initially present.

Thus, in one specific application of my process, TiCl₄ may be heated in the presence of a small quantity of a hydrated form of titania, whereby the water of hydration serves to hydrolyze partially a portion of the TiCl₄, producing the desired titanyl chloride purifying agent or decolorant "in situ." In another application, a part of the crude TiCl₄ may be first added to a small amount of free water to form the titanyl chloride separately, and the remaining TiCl₄ to be purified then added thereto. Many other variations in procedure will be obvious to those skilled in the art and are inherent in my invention.

The material which I call "titanyl halide," or specifically "chloride," is also termed "hydrated titanium halide," or "titanium oxyhalide." In the case of the chloride, for example, this material is yellow-to-white, solid to syrupy-liquid, the partial hydrolysis product formed when TiCl₄ reacts with less than the stoichiometric requirement of water for forming $TiO_2$, or less than 2 mols of $H_2O$ per mol of $TiCl_4$.

$(TiCl_4 + 2H_2O \rightarrow TiO_2 + 4HCl)$

It may very possibly be that more than one compound is formed by the partial hydrolysis, but this is a phase of titanium chemistry which is not clearly understood. Various formulae have been postulated for the products, depending upon the relative molar proportions of reactants: $TiOCl_2$, $Ti(OH)_2Cl_2$, $Ti(OH)Cl_3$, or $Ti(OH)_3Cl$, etc.

Similarly, the substances which I have referred to as "hydrous" or "hydrated titania" are also called variously "titanyl hydroxide," "orthotitanic acid," and the like. An equivalent material is washed "acid hydrolysis cake," the product of hydrolyzing acid solutions of titanyl sulfate and washing the precipitated hydrated oxide to free it of the acid liquors resulting from the hydrolysis. Their structures and compositions, too, are not known, but are probably $Ti(OH)_4$, $TiO(OH)_2$, etc. What is known is that these hydrated hydrous oxide materials contain available water in some proportion, and it is that fact which is of prime importance for my purposes. I have found that anhydrous $TiO_2$ itself does not purify or decolorize titanium tetrahalides. It is the water of hydration which makes the difference. Apparently, this water reacts with part of the titanium halide, to give the desired titanyl halide, just as would free water. Thus the operative purifying material, whether titanium hydrate or free water be used in its preparation, appears to be titanyl halide. Although I cannot be sure, my theory is that the reactions, where hydration water is the hydrolyzing agent, may be somewhat as follows in the case of TiCl₄:

(1) $TiO(OH)_2 + TiCl_4 \rightarrow 2TiOCl_2 + H_2O$ or,
(2) $Ti(OH)_4 + TiCl_4 \rightarrow 2TiOCl_2 + 2H_2O$
(3) $H_2O + TiCl_4 \rightarrow TiOCl_2 + 2HCl$ Available water is produced in these cases (Equations 1 and 2) and it reacts to form additional titanyl chloride as shown in Equation 3.

The impure titanium halide should be subjected to heat during its period of contact with the titanyl halide and is preferably distilled therefrom. I have found that the refluxing time of 2 or more hours required in prior art decolorizing methods is not necessary with my invention. With my improved method, it has been found sufficient to allow about 15 minutes for the charge to be raised to the boiling point by gentle heating. A distillate of water-like clarity is obtained immediately thereafter and continued distillation yields the desired product. The time and temperature of the preliminary contact are necessarily interdependent with the quantity of purifying agent and the degree of contamination of the crude material. The use of from 0.5 to 20% by weight of titanyl chloride with a contact period of 15 minutes or more will satisfactorily purify discolored TiCl₄ made from most commercial titanium ores; and usually from 5 to 15% titanyl chloride contacted for about 10 to 20 minutes under such conditions will be enough. Naturally, the greater the quantity of titanyl chloride used, the more rapid the action, within reason, but also the more expensive the process. When the agent and the titanium halide have been in contact for a sufficient period of time to effect the decolorization, the tetrahalide may be separated out by simple distillation, leaving behind the titanyl halide and the colorizing impurities. The titanyl halide may subsequently be purified and reused.

The apparatus in which the contact is effected may be chosen at the will of the operator, and also depends in part on the time of contact, the quantity of purifying agent, and other factors. Essentially any apparatus known to the art may be employed, ranging from a simple glass flask to complex large scale reflux and distillation equipment. If desired, silicon tetrachloride, chlorine, and such low boiling compounds may be removed simultaneously by combining fractional distillation with the present operation.

The following described embodiment is used to illustrate how my invention may be employed commercially and is not intended to limit in any way its scope. The titanium tetrachloride-containing product obtained by the chlorination of a titanium-bearing mineral and coke is settled, and the "crude" TiCl₄ is decanted from the undissolved solids. As this "crude" is piped to the still pot of the purifying fractionating still a portion, about 5% of the feed, is removed. This portion is added slowly with constant agitation to 2 parts of pure water contained in a non-corrosive reaction vessel, and the HCl gas evolved is vented and thus removed. The product of this reaction, titanyl chloride, is introduced into the stream feeding the still pot. The fractionation column is operated with refluxing to allow HCl, Cl₂ and the lower boiling fraction to be removed as heads and the TiCl₄ as middling, with a drawoff at the still pot to remove spent titanyl chloride and sludge.

The following examples are given solely to illustrate my invention, and I wish to make it clear that they are not intended to limit its scope.

*Example I*

TiCl₄ was prepared by conventional chlorination of ilmenite ore. It was first decanted from the undissolved solid matter, then subjected to simple vaporization and fractional condensation to remove the low boiling heads, principally SiCl₄, CCl₄, COCl₂, and Cl₂. The "heads free TiCl₄" recovered was yellow in color and contained 98% TiCl₄ and 2% impurities.

86 parts by weight of this material were placed in a conventional distillation flask equipped with a refluxing condenser. 10 parts by weight of previously prepared granules of titanyl chloride were added thereto. Evolution of hydrogen chloride gas was observed, and the TiCl₄ became slightly turbid. Heat was then applied to allow distillation with partial refluxing. A sample of distillate obtained after 10 minutes of heating was clear and water white; a second sample obtained at the end of 30 minutes was similar in appearance. The residue in the distillation flask comprised a pale yellow opaque liquid and a flocculent, reddish-brown solid in suspension. This residue solidified on cooling.

Example II

Five parts by volume of the "heads free" titanium tetrachloride of Example I were slowly added with constant agitation to a glass distillation flask containing 2 parts by volume of distilled water. A vigorous exothermic reaction took place, wherein hydrogen chloride gas was evolved and a canary-yellow solid mass of titanyl chloride hydrolysate was produced. To this were then added 95 parts by volume of the same TiCl₄. Heat was applied to raise the temperature to about 137° C., requiring 15 minutes. Before this temperature was reached, the materials were thus allowed intimate contact. As the heat reached 60° C. and above, the yellow hydrolysate gradually changed in color to a dirty gray-brown. At about 137° C., the TiCl₄ boiled and the vapors thereof distilled over into an air-cooled condenser. The distillate was there collected and was found to be clear and water-white.

Example III

Three parts by weight of chemically pure hydrated titanium oxide were placed in a distillation flask. (This hydrated titania was first tested and found to lose 1 molecule of H₂O per molecule of TiO₂ upon ignition, thus indicating that it probably had 1 mol of water of hydration per mol of TiO₂.) 173 parts by weight of the predistilled TiCl₄ of Example I were then added to the flask. The material was heated at 135° C. for 2 hours. Following that, the heat was increased to allow boiling of the TiCl₄ and consequent vaporization. The vapors of TiCl₄ thus distilled off were condensed in a conventional water-cooled condenser. The product was again a clear water-white liquid. The residue in the distillation flask was grayish-white.

Example IV

The procedure of Example III was followed but using so-called "acid cake" or "commercial titanyl hydroxide." The same quality of TiCl₄ was again obtained following distillation, and the residue was brownish-red in color.

The effectiveness of my invention was proven by hydrolyzing with frozen distilled water samples of the "heads free TiCl₄" and of the respective decolorized samples, as well as of a control of purchased chemically pure TiCl₄. A small amount of ammonium hydroxide was added to retain any volatile acidic impurity. The hydrolyzed solutions and the suspensions were then evaporated to dryness and heated thoroughly in an oven at temperatures below 150° C. Spectographic analyses indicated that the samples purified by means of my invention as heretofore described were equal to or superior to the control of chemically pure material, in regard to copper, vanadium calcium and magnesium content. On the other hand, the "heads free" starting tetrachloride contained quantities of impurities far greater than those in the decolorized products.

It is desirable in my process that moisture other than that required to produce titanyl halide be excluded from the system, because if excessive qauntities of water were present, an equivalent amount of crude titanium tetrahalide desired to be purified would be lost by hydrolysis.

The practical discovery underlying my novel process is that titanyl halide, and secondarily, as a means for producing it, hydrated titania, act surprisingly enough to decolorize and purify anhydrous titanium tetrahalide. Whether the action of the titanyl compound involves adsorption of the impurities, or whether the compounds are caused thereby to hydrolyze or otherwise react to form less volatile compounds, is not known; but the result is that commercial titanium halides, particularly TiCl₄, can now be purified by a simpler, less expensive, more efficienet method than most prior art techniques allow.

My process is obviously also operable for the treatment of titanic halides other than the tetrachloride, e. g., titanium tetraiodide, titanium tetrabromide and titanium tetrafluoride. Accordingly, I contemplate the purification of these and similar compounds.

The economy of the operation is apparent because the only additional raw material needed, other than the tetrahalide to be treated, can be water, compared to the more expensive chemicals needed in prior art methods.

The phrase "titanyl halide" in the appended claims means the products of the partial hydrolysis of a titanium tetrahalide with free water or with the combined water of hydrated titania; and the terms "titanyl chloride," "titanyl bromide," etc. indicate the same as applied specifically to the tetrachloride, tetrabromide, etc. hydrolyses.

I claim:

1. A method for decolorizing and purifying a colored and impure titanium tetrahalide which comprises mixing said tetrahalide with a titanyl halide, heating the resulting mixture and subsequently distilling off the purified tetrahalide.

2. A method for decolorizing liquid titanium tetrachloride containing coloring impurities which comprises heating said liquid for at least 10 minutes in admixture with from .5 to 20% by weight of titanyl chloride and subsequently distilling off the purified titanium tetrachloride.

3. A method for decolorizing liquid titanium tetrachloride containing coloring impurities which comprises hydrolyzing a portion of the said tetrachloride with less than two molar equivalents of water, mixing the resulting hydrolysate with additional quantities of the said tetrachloride, and then heating and distilling off the resulting purified titanium tetrachloride.

4. A method of decolorizing liquid titanium tetrachloride containing coloring impurities which comprises reacting a small portion of the tetrachloride with water to produce dry titanyl chloride, dispersing the said titanyl chloride in the remainder of said tetrachloride, heating the resulting mixture up to the boiling point, boiling said dispersion of titanium tetrachloride and titanyl chloride in a distillation apparatus, and collecting the condensed purified TiCl₄.

5. A method of decolorizing liquid titanium tetrachloride containing coloring impurities which comprises dispersing from 5 to 15 parts by weight of titanyl chloride in 100 parts by weight of said tetrachloride, heating said mixture to the boiling point for a period of from about 10–20 minutes, and distilling off the resulting purified titanium tetrachloride.

6. A method for decolorizing and purifying contaminated and colored titanium tetrachloride which comprises mixing said titanium tetrachloride with titanyl chloride, heating the resulting mixture and subsequently distilling off the resulting purified titanium tetrachloride.

7. A method for removing discoloring materials from titanium tetrabromide which comprises mixing said tetrabromide with titanyl bromide, heating the resulting mixture and subsequently distilling off and recovering the purified titanium tetrabromide.

8. A method for removing discoloring materials from titanium tetraiodide which comprises mixing said tetraiodide with titanyl iodide, heating the resulting mixture, and subsequently distilling off and recovering the resulting purified titanium tetraiodide.

DOUGLAS GILLISON NICHOLSON.

REFERENCES CITED

The following references are of record in the file of this patent:

UNITED STATES PATENTS

| Number | Name | Date |
|---|---|---|
| 2,178,685 | Gage | Nov. 7, 1939 |
| 2,344,319 | Meister | Mar. 14, 1944 |
| 2,416,191 | Meister | Feb. 18, 1947 |